E. A. LELAND.
COMBINED STOP-COCK AND T JOINT.
No. 178,311. Patented June 6, 1876.
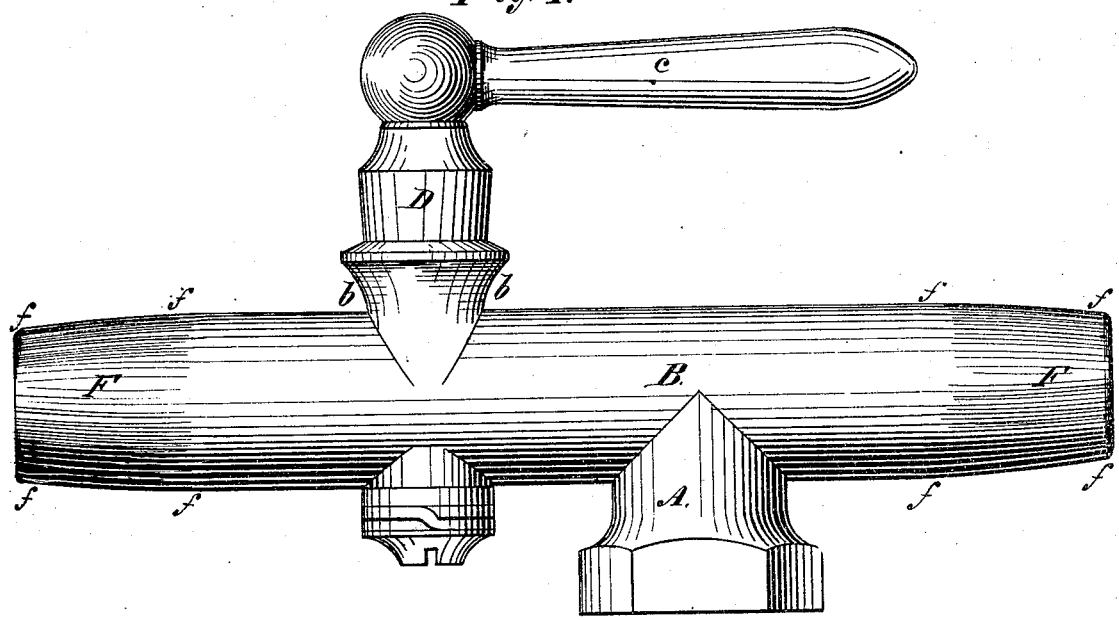
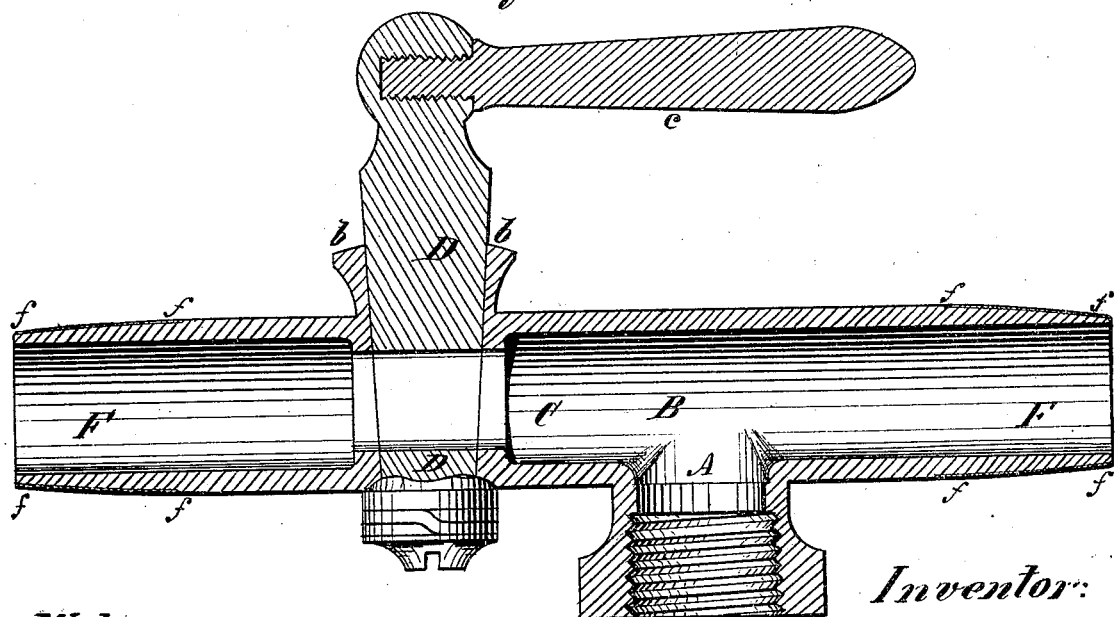
Witnesses:
Henry Eichling
Edward Holly
Inventor:
Edwin A. Leland
per James A. Whitney
Atty.

UNITED STATES PATENT OFFICE.

EDWIN A. LELAND, OF NEW YORK, ASSIGNOR TO LEONARD RICHARDSON, OF BROOKLYN, N. Y.

IMPROVEMENT IN COMBINED STOP-COCKS AND T-JOINTS.

Specification forming part of Letters Patent No. 178,311, dated June 6, 1876; application filed April 3, 1876.

*To all whom it may concern:*

Be it known that I, EDWIN A. LELAND, of the city, county, and State of New York, have invented an Improvement in Combined Stop-Cocks and T-Joints for Range-Boilers, &c., of which the following is a specification:

The object of this invention is to avoid the necessity of separately wiping in stop-cocks and T-joints used in range-boilers and other like apparatus, this work being ordinarily expensive, clumsy in appearance, and the joints liable to sweat or leak.

My invention consists in a combined stop-cock and T-joint formed in one with a short connecting section of pipe, and with its ends made tapering, and tinned or speltered. By this means I produce a device, hitherto unknown in the trade, which provides a stop-cock and T-joint, always in requisite relation with each other, and of a much more symmetrical appearance than the stop and T-joints as separately constructed, and which will not sweat or leak, and which may readily be applied in the pipe of the range-boiler or like apparatus with which the stop-cock and T-joint are required to be used.

Figure 1 is a side view, and Fig. 2 a central longitudinal section, of a combined stop-cock and T-joint made according to my invention.

A is the stem, and B the T or head, of the T-joint, the stem A being provided with an internal screw-thread, *a*, or by a suitable branch pipe or connection may be attached. B is the plug of the stop-cock, provided with the usual handle *c*, said plug working, in the ordinary manner, in and through the socket *b*. The T-joint A B is connected with the stop-cock D *b c* by short pipe C. The ends F of the device are extended, as indicated in the drawings, and made tapering, as shown at *f*. The tapering portions *f* aforesaid are externally tinned or speltered, in order that the ends of the pipe in which the device is to be used may be readily soldered upon the said parts *f* in the attachment of the device in place.

It will be seen that the T-joints A B, the short pipe-section C, socket *b*, and tapering ends F are all cast in one piece, these parts, together with the plug D and its immediate adjuncts, constituting a complete device or piece of mechanism, which would be inoperative or fail of its object if any one of the hereinbefore-specified parts were removed; a combined stop-cock and T-joint being by this means provided, in which the stop-cock and T-joint are connected with wiped joints, and are consequently free from the hereinbefore-indicated objections to such joints, the device being capable of attachment in the pipe of the range-boiler, or the like, by the simple soldering of the ends of said pipe upon tapering tinned or speltered surfaces *f* on the ends F, which are extended at such distance from the stop-cock and the T-joint, respectively, as to enable said soldering to be performed with facility and dispatch.

What I claim as my invention is—

The herein-described new article of manufacture—the combined stop-cock and T-joint—comprising the T-joint A B, the stop-cock D *b c*, and the extended ends F, tinned or speltered and made tapering, as shown at *f*, the same combined, constructed, and arranged substantially as and for the purpose herein set forth.

EDWIN A. LELAND.

Witnesses:
EDWARD HOLLY,
H. WELLS, Jr.